United States Patent [19]

Watanabe

[11] Patent Number: 4,644,969
[45] Date of Patent: Feb. 24, 1987

[54] WATER CONTROL VALVE WITH PNEUMATIC ACTUATOR

[75] Inventor: Mituru Watanabe, Tokyo, Japan

[73] Assignee: Oki Electric Industry Co., Ltd., Tokyo, Japan

[21] Appl. No.: 766,295

[22] Filed: Aug. 16, 1985

[30] Foreign Application Priority Data

Aug. 20, 1984 [JP] Japan ............................... 59-171595
Sep. 25, 1984 [JP] Japan ............................... 59-143511

[51] Int. Cl.$^4$ ..................... F16K 11/02; F16K 31/126
[52] U.S. Cl. .......................... 137/625.27; 137/625.5; 137/625.26; 137/625.49; 251/335.2
[58] Field of Search .............. 251/335.1, 335.2, 335.3, 251/62, 63, 63.4, 63.5, 63.6, 368, 210; 137/625.5, 625.27, 551, 312, 313, 314, 625.26, 625.49; 92/168 B, 82; 74/18.2

[56] References Cited

U.S. PATENT DOCUMENTS

| | | | |
|---|---|---|---|
| 955,770 | 4/1910 | Dehn | 137/625.26 |
| 1,983,106 | 12/1934 | Sundstrom | 251/335.3 X |
| 2,035,202 | 3/1936 | Smith | 251/335.3 X |
| 2,682,386 | 6/1954 | Lindsay | 251/335.3 X |
| 2,691,773 | 11/1954 | Lichtenberger | 74/18.2 X |
| 2,693,822 | 11/1954 | Gerow et al. | 137/551 |
| 3,260,504 | 7/1966 | Mojonnier et al. | 137/625.5 X |
| 3,269,411 | 8/1966 | Teston | 251/368 X |

FOREIGN PATENT DOCUMENTS

| | | | |
|---|---|---|---|
| 1181053 | 6/1959 | France | 251/335.3 |
| 869101 | 5/1961 | United Kingdom | 251/335.3 |

OTHER PUBLICATIONS

Norbert M. Bikales, Ed. "Encyclopedia of Polymer Science and Technology" 1971, vol. 14, p. 607.

Primary Examiner—Martin P. Schwadron
Assistant Examiner—John S. Starsiak, Jr.
Attorney, Agent, or Firm—Wenderoth, Lind & Ponack

[57] ABSTRACT

A pneumatically-operated water control valve includes an air actuator, a valve control portion, and an intermediate cylinder block mounted between the air actuator and the valve control portion. The intermediate cylinder block has a first bellows, a second bellows and an intermediate shaft which are placed so as to form a closed space. The intermediate shaft is serially connected between a piston shaft of the actuator and a valve shaft of the valve control portion. The closed space separates the piston shaft from the valve control portion.

5 Claims, 3 Drawing Figures

WATER CONTROL VALVE WITH PNEUMATIC ACTUATOR

BACKGROUND OF THE INVENTION

1. Field of the Invention

This invention relates to a pneumatically-operated water control valve suitable for use in semiconductor integrated circuit (IC) device manufacturing plants.

2. Description of the Related Art

It is common knowledge that IC device manufacturing plants require a great amount of pure water in the wafer manufacturing processes.

Pure water for IC manufacture is produced by a water purification plant and supplied to the IC manufacturing plant through a piping system. The piping system generally forms a closed loop which comprises a first main pipe for supplying pure water from a water purification plant to an IC plant and a second main pipe for returning unused pure water from the IC plant to the water purification plant. Air-operated water control valves are conventionally used at use points of the piping system to distribute pure water to desired sections of an IC manufacturing line. When the water control valve is in a closed condition, the unused pure water returns to the water purification plant to purify it to a desired purity. The conventional water control valve has in it a bellows which prevents pure water from contacting the piston shaft in the air actuator and is made of, for example, TEFLON (Trademark of Du Pont polytetrafluoroethylene).

In general, a lubricating oil is applied on the surface of the piston shaft to provide for its smooth movement. A long use of the water control valve sometimes results in a crack in the bellows due to fatigue failure. Such failure would result in oil leakage causing serious damage to the whole pure water piping system and sudden degradation of the purity of the pure water, resulting in a poor yield of IC devices.

Since a prior art water control valve with an air-operated actuator has an opening providing communication between the inside of the bellows and the atmosphere, a bellows failure can be detected by observing pure water leaking from the opening.

However, it has been difficult to find the belllows failure before contamination of the pure water piping system.

SUMMARY OF THE INVENTION

Accordingly, it is an object of this invention to provide an improved pneumatically-operated water control valve suitable for use in the semiconductor IC device manufacturing fields.

It is another object of this invention to provide a pneumatically-operated water control valve having a couple of bellows therein.

It is still another object of this invention to provide a pneumatically-operated water control valve which can prevent a pure water piping system from being contaminated by a lubricating oil.

According to an aspect of this invention, there is provided a pneumatically-operated water control valve comprising: air actuating means having an air cylinder, an air piston ring placed in the cylinder, and a piston shaft connected to the piston ring; a valve portion controlling the flow of water by the air actuating means, and comprising a valve cylinder, a pair of stationary valve seats placed in the valve cylinder so as to face each other in a parallel way, and an obturator placed between the stationary valve seats, and a valve shaft connecting to the obturator; an intermediate cylinder mounted between the air cylinder and the valve portion; an intermediate valve shaft serially connected between the piston shaft and the valve shaft; a first bellows having one end hermetically mounted to the upper portion of the intermediate valve shaft and the other end hermetically mounted to the inner wall of the intermediate cylinder; and a second bellows having one end hermetically mounted to the lower portion of the intermediate shaft and the other end hermetically mounted to the inner wall of the intermediate cylinder; whereby the first and second bellows form a space isolating the piston shaft from the valve shaft.

The above and other objects, features and advantages of the invention will be more apparent from the following detailed description taken in conjunction with the accompanying drawings.

DETAILED DESCRIPTION OF THE PREFERRED EMBODIMENT

An air-operated three-way water control valve according to this invention will be described with reference to FIGS. 1, 2 and 3.

Figure 1:
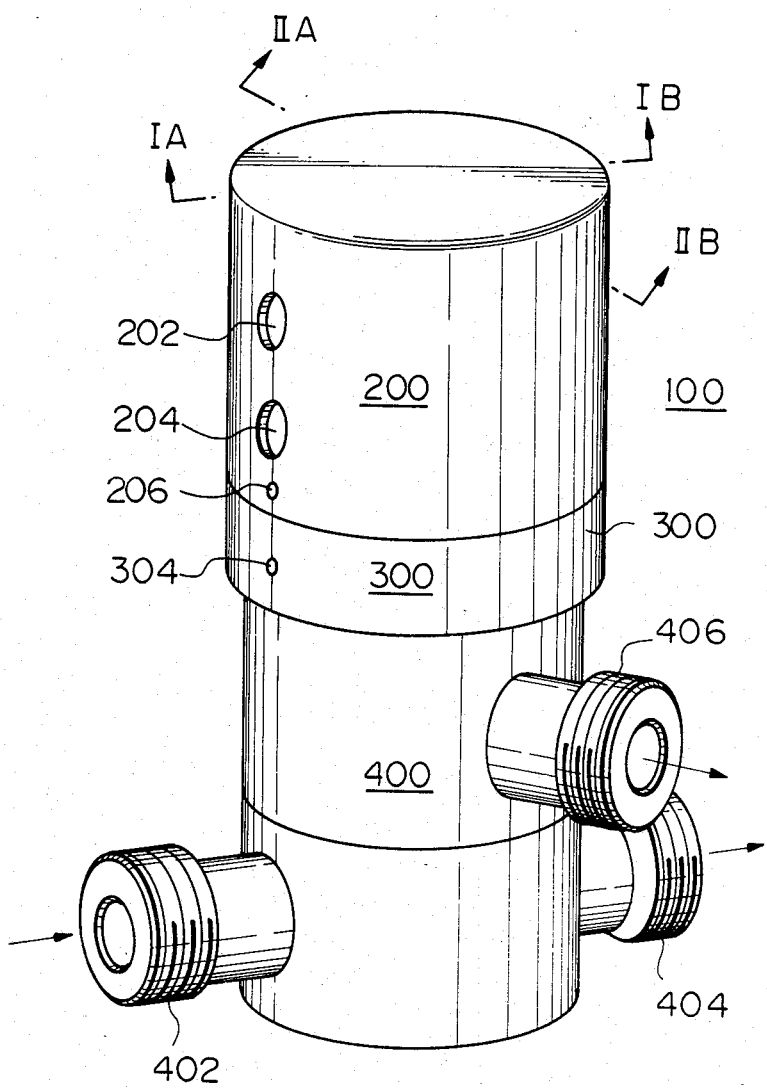
FIG. 1 is a perspective whole view showing an air-operated three-way water control valve according to this invention.

In FIG. 1, a water control valve 100 comprises an air actuating portion 200 driven by compressed air, an intermediate cylinder 300, and a valve portion 400 for controlling the flow of pure water. The actuating portion 200 has two air inlets 202 and 204 which introduce a highly compressed air. The intermediate cylinder 300 has an air releasing opening 302 therein. Also, the valve portion 400 is mounted with a main connector 402 for intaking pure water, and connectors 404, 406 for supplying pure water. The connector 402 will be coupled to a main supply line of the pure water piping system. On the other hand, the connector 404 will be coupled to a main return line of the piping system through a branch pipe line, and the connector 406 will be coupled to bibcocks in the IC plant through another branch pipe line.

Figure 2:
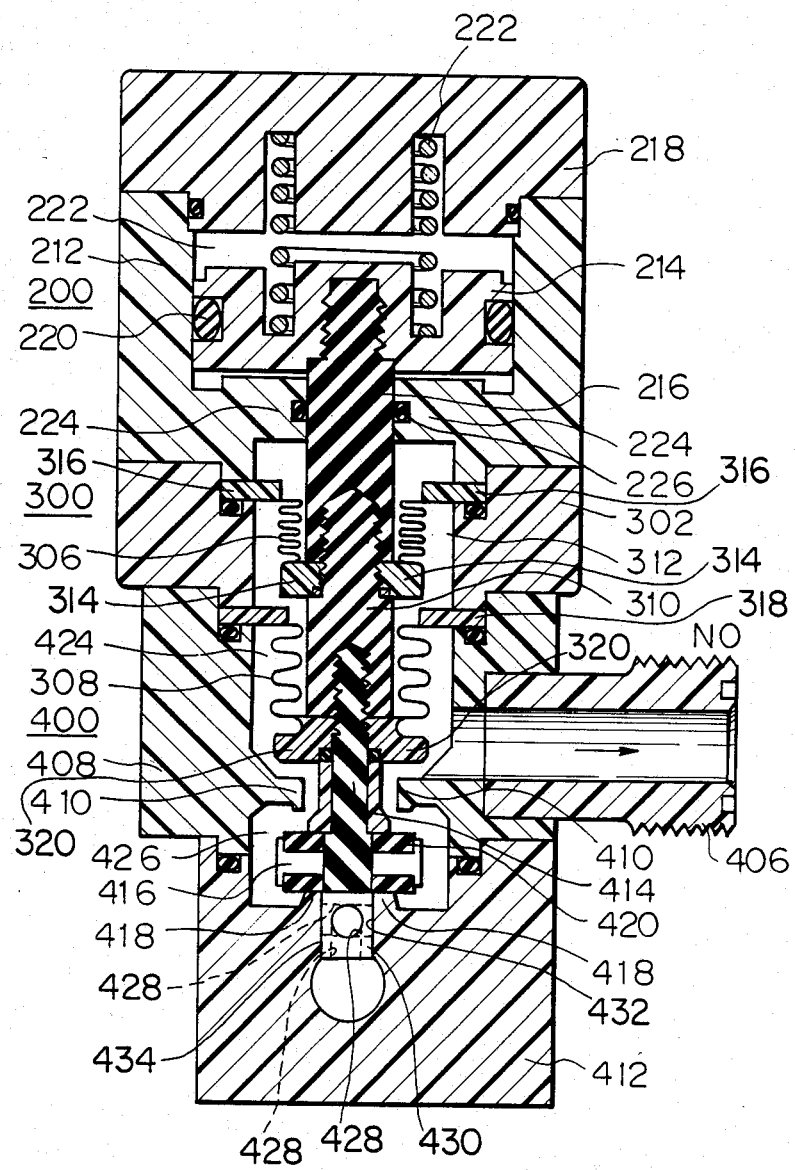
FIG. 2 is a cross-sectional view taken along line IA–IB of FIG. 1.
Figure 3:
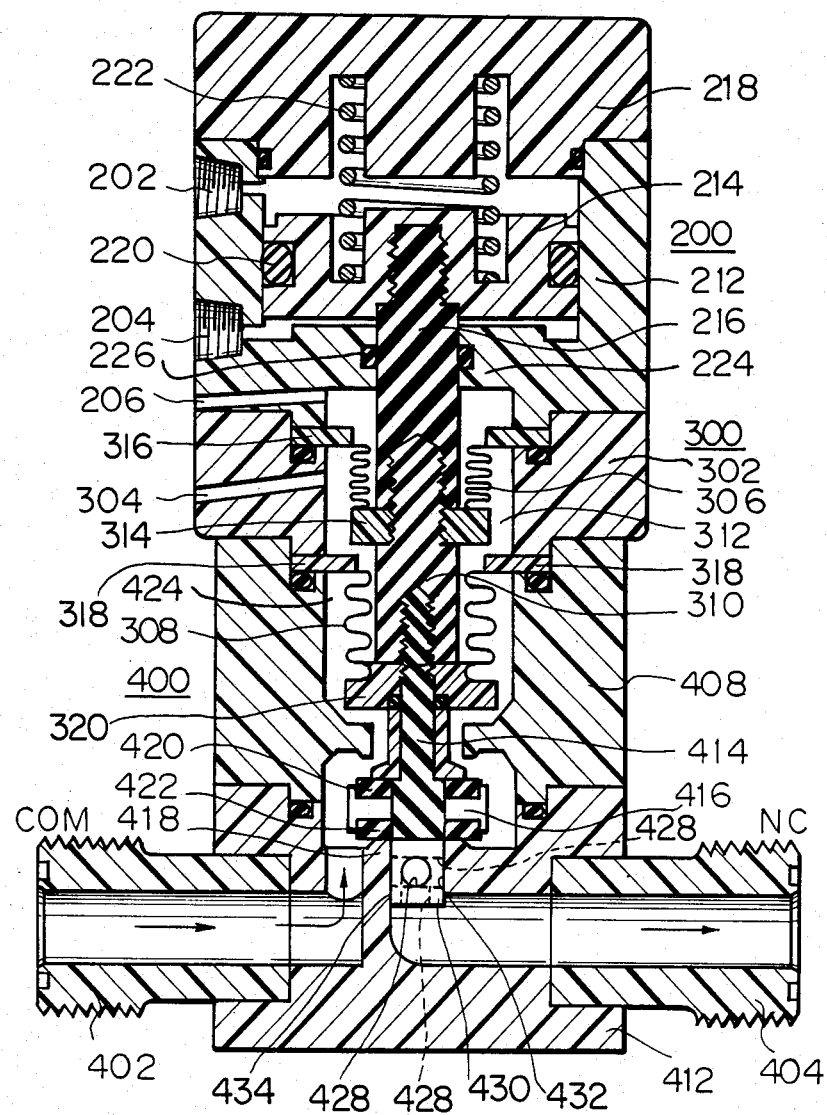
FIG. 3 is a cross sectional view taken along line IIA–IIB of FIG. 1.

In FIGS. 2 and 3, the actuating portion 200 comprises an air cylinder 212, a piston ring 214 placed inside the cylinder 212, a piston shaft 216 fixedly connected to the piston ring 214, a cylinder cap 218 concealing the cylinder block 212. A polyvinyl chloride material, for example, is suitable for the cylinder block 212, the piston ring 214, and the cylinder cap 218. A polyvinylidene flouride resin material may be preferably used for the piston shaft 216. An O-ring 220 is placed in a gasket groove of the piston ring 214 which is loaded downward by the return springs 222. The piston shaft 216 is supported by a piston guide portion 224 of the cylinder block 212 and packed with an O-ring 226 of fluororubber material. Also, the cylinder block 212 has an air releasing opening 206 for providing communication between an inner space of the cylinder block 212 and the atmosphere.

The intermediate cylinder block 302 is serially mounted to the air cylinder block 212 and has an opening 304 allowing the air therein to release to the atmosphere. The intermediate cylinder block 302 is preferrably made of a polyvinyl chloride material. A first bellows 306 is placed in the intermediate cylinder block 302 so as to isolate the inner space thereof from the piston shaft 216. A thickened lower end portion of the bellows 306 is fixedly hermetically mounted to the lower end portion of the piston shaft 216, and on upper thickened end portion 316 is mounted to the upper portion inside of the intermediate cylinder block 302. The bellows 306 is formed of Teflon (Trademark of Du Pont for polytetrafluoroethylene) which is chemically stable and the two thick end portions 314 and 316 thereof may be integrally formed. An intermediate shaft 310 is serially connected to the piston shaft 216. For example, a vinylidene fluoride resin material is suitable for the intermediate shaft 310.

A second bellows 308 is provided in such a way that a thickened upper end portion 318 is fixedly mounted to the lower portion of the intermediate cylinder 302 and a thickened lower end portion 320 is fixedly connected to the lower portion of the intermediate shaft 310. A closed space 312 is formed by both the bellows 306 and 308. The second bellows 308 is preferrably also of Telfon material and may be integrally formed so as to have the two thick end portions 318 and 320 thereof.

The valve portion 400 comprises a valve cylinder 408 having a stationary valve seat 410, a valve base portion 412 having a second stationary valve seat 418, and a valve shaft 414, and an obturator 416. The valve shaft 414 is serially connected to the lower end of the intermediate shaft 310. The obturator 416 is mounted to the lower portion of the valve shaft 414. The second bellows 308 is contained in the valve cylinder 408. The obturator 416 is placed between the stationary valve seats 410 and 418, and has seat packings 420 and 422 of fluororubber material placed on both sides thereof, respectively.

The valve cylinder 408 is provided with the connector 406 and has a first space 424 communicating to the passage thereof. The second space 426 containing the obturator 416 communicates with the first space 424 through the middle opening of the stationary valve seat 410. Also, the second space 424 communicates with the passage of the connector 402. The passage of the connector 404 communicates with the space 426 through the opening in the stationary valve seat 418.

For example, the valve cylinder 408 and the valve base portion 412 are made of polyethylene material. The valve shaft 414 is made of a polytrifluoride ethylene chloride resin material. The obturator 416 is made of a polyethylene material.

In operation, when pure water is not used at use points of an IC plant, the obturator 416 is pressed against the stationary valve seat 418 by supplying compressed air of 3 to 5 Kg/cm$^2$ to the piston ring 214 through the air inlet 202.

Then, pure water flows from the connector 402 to the connector 406 through the first and second spaces 424 and 426.

When pure water is used at the use points of the IC plant, the obturator 416 is pressed against the stationary valve seat 410 by supplying compressed air on the piston ring 214 through the air inlet 204. In this case, pure water flows from the connector 402 to the connector 404 through the second space 426 and holes 428 in a guiding portion 430 of the obturator 416 below the valve shaft 414 slidably mounted in a through hole 432 of the stationary valve seat 418. In particular, the guiding portion 430 has a side surface 434 in sliding contact with a vertically extending surface of the valve base portion 412 defining the through hole 432. The holes 428 communicate at one end with the flow passage in the connector 404 and opens at the other end in the surface 434 so that when the obturator 416 is in sealing engagement with the stationary valve seat 410, the flow passage in connector 404 is in fluid communication with the space 426 surrounding the obturator 416.

According to this invention, since two bellows are provided so as to separate the piston shaft from one bellows contacting pure water, pure water pollution due to bellows failure can be prevented. In this embodiment, lublicating oil applied on the piston shaft is collected in the bellows 306. In case the bellows 308 fails (cracks), the leaked pure water which leaks is collected in the intermediate space and then released out of the opening 304. Therefore, an operator can easily find the crack failure of the bellows before the pure water piping system is completely polluted.

What is claimed is:

1. A pneumatically operated three-way pure water control valve for use in pure water piping systems for semiconductor manufacturing plants, comprising:

an air actuator, including an air cylinder, an air piston ring disposed in said air cylinder for sliding reciprocal movement therein in response to air pressure applied thereto, and a piston shaft connected to said piston ring for movement with said air piston ring in said air cylinder;

a valve portion, including a valve cylinder, a first stationary valve seat having a through-hole therein, a second stationary valve seat opposing said first valve seat, an obturator between said first and second valve seats, reciprocally movable in opposite directions into sealing engagement with said first and second valve seats, and a lower valve shaft mounted to said obturator, an intermediate cylinder mounted between said air cylinder and said valve portion and having an opening communicating with the atmosphere;

an intermediate valve shaft serially connected at an upper end thereof to said piston shaft and at a lower end thereof to said lower valve shaft, for transmitting movement of said piston shaft to said obturator to alternatively move said obturator into sealing engagement with said first valve seat and said second valve seat;

a first bellows formed of polytetrafluoroethylene having one end hermetically mounted to said lower end of said intermediate shaft and the other end hermetically mounted to said inner wall of said intermediate cylinder; and a second bellows formed of polytetrafluoroethylene having one end hermetically mounted to said upper end of said intermediate shaft and the other end hermetically mounted to said inner wall of said intermediate cylinder, such that said first and second bellows define a space therebetween isolating said piston shaft from said lower valve shaft;

said first bellows having a first thickened polytetrafluoroethylene end portion hermetically mounted between a top end of said intermediate cylinder and a bottom end of said air cylinder and a second thickened polytetrafluoroethylene end portion opposite said first thickened end portion hermetically mounted between a top end of said intermediate valve shaft and a bottom end of said piston shaft, said second bellows having a third thickened polytetrafluoroethylene end portion hermetically mounted between a top end of said valve cylinder and a bottom end of said intermediate cylinder and a fourth thickened polytetrafluoroethylene end portion opposite said third thickened end portion hermetically mounted between a top end of said lower valve shaft and a bottom end of said intermediate valve shaft.

2. A valve as in claim 1, wherein said valve portion includes a valve base portion integral with said first valve seat and mounted to a bottom end of said lower valve cylinder, said valve base portion having a flow passage therein, said through-hole communicating with the exterior of said valve through said flow passage, said obturator having a guiding portion below said valve shaft slidably mounted for vertical movement in said through-hole, said guiding portion having a side surface in sliding contact with a vertically extending surface of said valve base portion defining said through-hole, said guiding portion having at least one hole therein communicating at one end with said flow passage and opening at another end in said surface of said guiding portion such that when said obturator is in sealing engagement with said second valve seat, said flow passage is in fluid communication with a space surrounding said obturator through said at least one hole.

3. A valve as in claim 1, wherein said intermediate shaft is formed of polyvinylidene fluoride resin material and said intermediate cylinder is formed of polyvinyl chloride material.

4. A valve as in claim 1, wherein said valve portion includes a valve base portion integral with said first valve seat and mounted to a bottom end of said lower valve cylinder, said valve base portion having first flow passage and a second flow passage therein, said through-hole communicating with the exterior of said valve through said first flow passage, said lower valve cylinder and said valve base portion enclosing a first space surrounding said obturator, said second flow passage opening at opposite ends thereof to the exterior of said valve and into said first space, said valve cylinder having a third flow passage therein above said second valve seat opening at opposite ends thereof to the exterior of said valve and into a second space enclosed by said lower valve cylinder above said second valve seat, said first and second spaces communicating with each other through said second valve seat when said obturator is in sealing engagement with said first valve seat, said first flow passage communicating with said second flow passage through said through-hole and said first space when said obturator is in sealing engagement with said second valve seat.

5. A pneumatically operated three-way pure water control valve for use in pure water piping system for semiconductor manufacturing plants, comprising:

an air actuator, including an air cylinder and air piston ring disposed in said air cylinder for sliding reciprocal movement therein in response to air pressure applied thereto, and a piston shaft connected to said piston ring for movement with said air piston ring in said air cylinder;

a valve portion, including valve cylinder, a first stationary valve seat having a through-hole therein, a second stationary valve seat opposing said first valve seat, an obturator between said first and second valve seats, reciprocally movable in opposite directions into sealing engagement with said first and second valve seats, and a lower valve shaft mounted to said obturator, an intermediate cylinder mounted between said air cylinder and said valve portion and having an opening communication with the atmosphere;

an intermediate valve shaft serially connected at an upper end thereof to said piston shaft and at a lower end thereof to said lower valve shaft, for transmitting movement of said piston shaft to said obturator to alternatively move said obturator into sealing engagement with said first valve seat and said second valve seat;

a first bellows formed of polytetrafluoroethylene having one end hermetically mounted to said lower end of said intermediate shaft and the other end hermetically mounted to said inner wall of said intermediate cylinder;

a second bellows formed of polytetrafluoroethylene having one end hermetically mounted to the upper end of said intermediate shaft and the other end hermetically mounted at an inner wall of said intermediate cylinder, such that said first and second bellows defined a space therebetween isolating said piston shaft from said lower valve shaft;

said valve portion including a valve base portion integral with said first valve seat and mounted to a bottom end of said lower valve cylinder, said valve base portion having a flow passage therein, said through-hole communicating with the exterior of said valve through said flow passage, said obturator having a guiding portion below said valve shaft slidably mounted for vertical movement in said through-hole, said guiding portion having a side surface in sliding contact with a vertically extending surface of said valve base portion defining said through-hole, said guiding portion having at least one hole therein communicating at one end of said flow passage and opening at another end in said surface of said guiding portion such that when said obturator is in sealing engagement with said second valve seat, said flow passage is in fluid communication with a space surrounding said obturator through said at least one hole.

* * * * *